United States Patent
Katoh et al.

(10) Patent No.: US 7,322,091 B2
(45) Date of Patent: Jan. 29, 2008

(54) VIBRATION ISOLATING BUSHING AND ITS MANUFACTURING METHOD

(75) Inventors: Akihiko Katoh, Osaka (JP); Tadayuki Suzuki, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 942 days.

(21) Appl. No.: 10/332,551

(22) PCT Filed: Jul. 11, 2001

(86) PCT No.: PCT/JP01/06027

§ 371 (c)(1),
(2), (4) Date: Apr. 25, 2003

(87) PCT Pub. No.: WO03/008129

PCT Pub. Date: Jan. 30, 2003

(65) Prior Publication Data

US 2005/0138787 A1    Jun. 30, 2005

(51) Int. Cl.
*B23P 11/00* (2006.01)
*B21D 21/00* (2006.01)

(52) U.S. Cl. .............. 29/436; 29/465; 29/512; 29/515; 29/898.057; 72/84; 72/112

(58) Field of Classification Search .......... 29/436, 29/446, 450, 451, 465, 469.2, 512, 515, 516, 29/898.057, 898.059; 72/67, 112, 115, 117, 72/84

See application file for complete search history.

(56) References Cited

U.S. PATENT DOCUMENTS 1,756,160 A * 4/1930 Lohs ................... 29/894.362
2,177,584 A * 10/1939 Salansky ............... 29/898.056
2,572,215 A * 10/1951 Swart .................... 403/228
3,230,000 A * 1/1966 Simpson ................ 403/228
3,345,724 A * 10/1967 Miller et al. .......... 29/898.059
3,824,660 A * 7/1974 Lowe .................... 29/898.054

(Continued)

FOREIGN PATENT DOCUMENTS

JP          53-46194          12/1978

(Continued)

*Primary Examiner*—David P. Bryant
*Assistant Examiner*—Alexander P Taousakis
(74) *Attorney, Agent, or Firm*—Knobbe Martens Olson & Bear, LLP

(57) ABSTRACT

This invention relates to a vibration isolating bushing, for example, built into a suspension system, an inside diameter of one edge (4) of an inner cylinder (1) being made larger than that of the other edge (6). The outside diameter of the thinner edge (4) is enlarged by applying pressure with a pressure forming jig (26) to the thicker edge surface (25), with the thinner edge surface (20) of the inner cylinder (1) abutted on a base (23). After completion of enlargement of the outside diameter of the thinner edge (4), the outside diameter of the thicker edge (6) is enlarged by further pressure with the pressure forming jig (26), this process thus capable of enlarging the outside diameter of both edges (4), (6) with one continuous working step. Surface unit pressure applied by another member can be made smaller by enlarging the outside diameter of the thinner edge (4), and the outer cylinder (2) can be prevented from being slipping out from the inner cylinder through the enlargement of the outside diameter of the thicker edge (6).

1 Claim, 8 Drawing Sheets

U.S. PATENT DOCUMENTS

| | | | |
|---|---|---|---|
| 4,736,510 A * | 4/1988 | Jorg et al. | 29/436 |
| 5,301,414 A | 4/1994 | Gautheron | |
| 6,065,322 A * | 5/2000 | Tabata et al. | 72/334 |
| 6,394,779 B1 * | 5/2002 | Komazawa et al. | 425/123 |
| 6,918,277 B2 * | 7/2005 | Takahashi et al. | 72/112 |
| 2004/0011103 A1 * | 1/2004 | Takahashi et al. | 72/84 |

FOREIGN PATENT DOCUMENTS

| | | |
|---|---|---|
| JP | 7-167142 | 7/1995 |
| JP | 2000-301249 | 10/2000 |

* cited by examiner (a)

(b)

(a)

(b)

VIBRATION ISOLATING BUSHING AND ITS MANUFACTURING METHOD

FIELD OF THE INVENTION

This invention relates to a vibration isolating bushing, for example, built in a part of a suspension system of an automobile, to control vibration, etc. propagated from wheels to the vehicle body, and to its manufacturing method.

DESCRIPTION OF THE RELATED ART

In general, in an automobile such as a passenger car, a vibration isolating bushing has been built as part of the suspension system or the support mechanism of the engine, so as to control vibration propagated from the wheels to the vehicle body or vibration etc. from the engine to the vehicle body.

FIG. 9 shows an example of vibration isolating bushing. The vibration isolating bushing comprises a metal inner cylinder 101, an outer cylinder 102 disposed outside the inner cylinder with an interval between them, and a rubber elastomer 103 interposed between the inner and outer cylinders 101, 102, the inner and outer cylinders 101, 102 each fixed respectively to another member to connect these two members so that vibration is isolated.

The inner cylinder 101 has an inside diameter which is nearly constant along the axial direction, with a shaft member inserted inside, and is fastened to attachment members such as brackets, in the state that both extremities 104 are held between attachment members or that only one of the extremities 104 is abutted to an attachment member.

At both edges 105 of the inner cylinder 101, enlarging of the outside diameter to enlarge the areas of both extremities 104 has been carried out to reduce the surface pressure between the edge surface 104 and the attachment member when the two are fastened. In addition, since the outside diameter of both edges 105 is enlarged and becomes larger than the inside diameter of the outer cylinder 102 disposed around the central portion of the inner cylinder 106, the outer cylinder 102 is prevented from slipping away from the inner cylinder 101 when the rubber elastomer 103 deforms excessively.

FIG. 10 shows the process of extending both extremities 105 of the inner cylinder 101. This extending work is performed to depress the pressure welding surface 108 of a pressure forming jig 107 upon the extremities 104 of the inner cylinder 101 and then make the pressure forming jig 107 rotate. This extending work is carried out at every edge 105 to extend the outside diameter of both edges 105.

Incidentally, when the inner cylinder 101 of the vibration isolating bushing is fixed to a member on the wheel side, the inner cylinder 101 may be fixed by inserting into it a bolt extending from the back side of the member, etc., with the extremities 104 of the inner cylinder 101 abutted with the member. In this case, since it is difficult to insert the bolt in the inner cylinder 101, it takes a long time to install the vibration isolating bushing, which has caused increase in cost.

Both edges 105 of each inner cylinder 101 are worked individually. Therefore, after one edge 105 has been worked, the pressure forming jig 107 must be removed and orientation of the inner cylinder 101 be reversed, and the pressing welding jig 107 must be set up again before working the other edge 105. This causes prolonged working time and increase in cost.

DISCLOSURE OF THE INVENTION

Starting with a vibration isolating bushing comprising a metal inner cylinder, an outer cylinder disposed outside the inner cylinder with an interval between them, and a rubber elastomer interposed between the inner and outer cylinders, the present invention provides a vibration isolating bushing that facilitates a bolt to be inserted into the inner cylinder from one end by making the inside diameter at one end in the axial direction of the inner cylinder larger than that at the central portion and at the other end, and also provides the manufacturing method of the vibration isolating bushing.

If the outside diameter at both edges of the inner cylinder is larger than that at the central portion, the pressure at the surface of the attachment member and the edge of the inner cylinder contacting each other is reduced, and it is possible to prevent the abutting surface of an attachment member from being depressed, prevent the contacting edge of the inner cylinder from buckling and the like, as well as preventing the outer cylinder from slipping out in the direction of the other end.

That is, when the outside diameter of the inner cylinder is constant along the axial direction, the area of one edge surface becomes smaller by making the inside diameter of that edge larger, and the area of one edge surface is made larger by making the outside diameter of that edge larger so as to make the surface pressure smaller. Further, the other side edge, the outside diameter of which is made larger, can be made to act as a stopper to restrain the outer cylinder from slipping out.

An inner cylinder the outside diameter at both edges of which is larger than that of the central portion can be formed by enlarging the outside diameter of both edges of a metal cylindrical body whose inside diameter at one edge is larger than that at the central portion and at the other edge, and whose outside diameter is initially nearly constant in the axial direction.

In other words, the metal cylindrical body whose thickness at one edge is made thinner than that of the central portion and the other side edge can, in the enlarging of the outside diameter of both edges, be worked more simply, starting from the edge which is not thinner.

Concretely, the outside diameter at the thinner edge, the thickness of which is thinner than at the other side edge, will be enlarged by abutting the former edge surface against a base and then making the pressure forming jig put pressure on the thicker edge surface. When keeping the pressure forming jig pressure on the thicker edge surface after completion of working of the thin edge, the outside diameter at the other side edge also will be enlarged.

If an inner die is fitted into the inner circumference of the thin edge when abutting that edge surface of the cylindrical body against the base, that edge can be prevented from buckling, the outside diameter will be enlarged without diminishing in diameter the inside diameter of the thin edge. Further, when the outer circumference of the thin edge is enclosed at a predetermined interval by an outer die, the outside diameter after enlarging can be made to be the predetermined size.

If one edge is made thinner than the sleeve at the central portion and the other edge, this working method can be adapted to any metal cylindrical body, not limited to the inner cylinder of the vibration isolating bushing. Further, the outside diameter of the cylindrical body need not be nearly constant along the axial direction.

A working apparatus equipped with a base abutting on the thinner edge surface of the cylindrical body, an outer die enclosing that edge of the cylindrical body and a pressure forming jig putting pressure on the thicker edge surface of the cylindrical body, may be used.

As for the base, the inner die fitted to the inner circumference of the cylindrical body may be provided on the abutting surface against which one edge surface of the cylindrical body is abutted. Consequently, since the inner die can be fitted concurrently when the cylindrical body is abutted on the base, the inner die can be made to impede slippage of the cylindrical body on the base during working.

The outer die may be of two detachable halves and freely detachable/attachable to the base, and an opening may be provided so as to enclose one edge of the cylindrical body at predetermined interval with it, in the state of being attached to the base. Since the outer die is of two detachable halves, there will be no problem with the cylindrical body whose outside diameter has enlarged being stuck in the outer die. Besides, attaching to the base can impede slippage from the inner die so that the thickness of the cylindrical body will not be variable after enlarging.

The pressure forming jig is formed to have a pressure contact surface that puts pressure on the thicker edge of the cylindrical body, and this pressure contact surface may be part of the surface of a circular cone. In this case, when the pressure forming jig is disposed so that the apex of the circular cone lies at the center of the thicker end of the cylindrical body and is turned, pressure is applied to the entire thicker edge.

To manufacture the vibration isolating bushing, the inside diameter of the one edge is first made larger than that of the central portion and of the other edge with the outer diameter kept roughly constant, the outer cylinder is disposed around the inner cylinder with rubber elastomer between the two. Incidentally, the outside diameter at both edges of the inner cylinder may be enlarged according to the aforementioned working method. By doing so, when the edge surface dies are taken out after vulcanization forming of the rubber elastomer, both edges, the outside diameter of which are not yet enlarged, do not get in the way.

In the same manner as the aforementioned working method, when abutting the thin edge surface of the inner cylinder against the base, the inner die may be fitted to the inner circumference of the thin edge and the outer circumference of the thin edge may be enclosed by the outer die so that there is a predetermined interval between the two.

BRIEF DESCRIPTION OF THE DRAWINGS

FIG. 8(a) shows the inner cylinder before working and FIG. 8(b) shows after working.

BEST MODE FOR CARRYING OUT THE INVENTION

Figure 1:
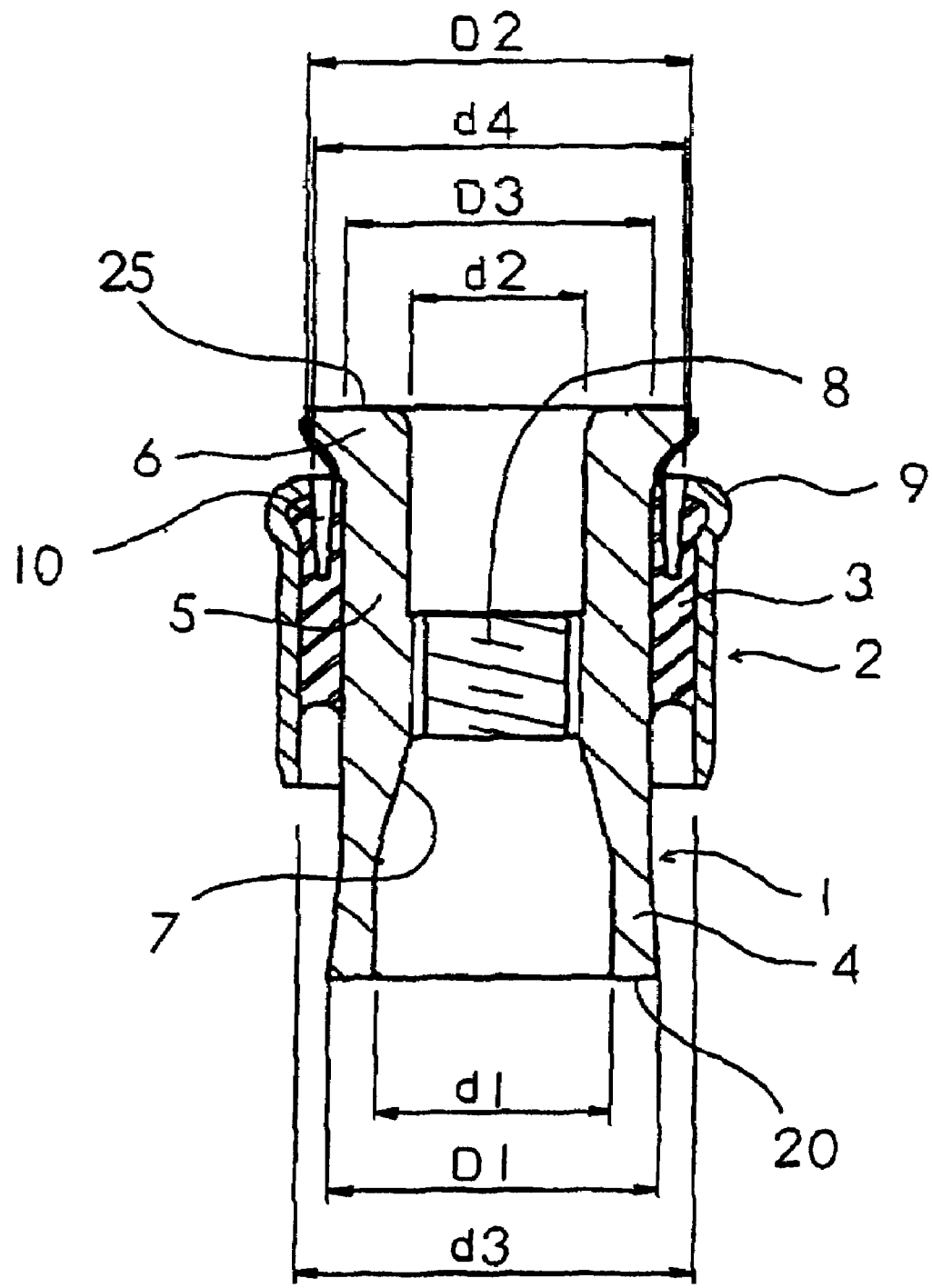
FIG. 1 is an axial sectional view of a vibration isolating bushing of the present invention.

Best mode for carrying out the present invention will be hereinafter described with reference to the drawings. As shown in FIG. 1, the vibration isolating bushing of the present embodiment comprises a metal inner cylinder 1, an outer cylinder 2 disposed around the inner cylinder with an interval between the two, and a rubber elastomer 3 interposed between the inner and outer cylinders 1, 2. The inner and outer cylinders 1, 2 are each fixed respectively to another member, to connect both members for the purpose of vibration isolation.

The inner cylinder 1 is, for example, a steel cylinder, the inside diameter (d1) of one edge 4 being larger than the inside diameter (d2) of the central portion 5 and of the other edge 6, so that a bolt 21 is easily inserted through the one end. Further, in order to eliminate the step at the inner surface at the boundary of the portion near the thin edge 4 with larger inside diameter and the center portion with smaller inside diameter, a portion tapering along the axial direction 7 is formed. Thus the bolt inserted will not get caught midway.

Female threads 8 are cut on the inner circumferential surface of the central portion 5 nearer to the edge 4, so as to screw the bolt 21 inside the inner cylinder 1 from the edge 4. The outside diameter (D1, D2) of both edges 4, 6 of the inner cylinder 1 are larger than the outside diameter (D3) at the central portion.

The outer cylinder 2 is, for example, of a steel cylindrical form, the axial length of which is nearly the same as the central portion 5 of the inner cylinder 1, and disposed outside of the central portion 5 of the inner cylinder 1. The inside diameter (d3) of the outer cylinder 2 is larger than the outside diameter (D3) of the central portion 5 of the inner cylinder 1 so that the rubber elastomer 3 can be interposed between the outer cylinder 2 and the inner cylinder 1.

At for one edge 9 of the outer cylinder 2, the portion very close to this edge is enlarged outwardly, and then the edge is again reduced in diameter so that it bulges out close to the edge, this bulge serving as a stopper when the outer cylinder 2 is press fitted into the opening 13 of another part. Since the inside diameter (d4) of this edge 9 is smaller than the outside diameter (D2) of the edge of the inner cylinder 1 in the same direction 6, the outer cylinder 2 will not slip out from this end of the inner cylinder 1.

The rubber elastomer 3 is in the form of a ring, interposed between the outer surface of the central portion 5 of the inner cylinder 1 and the inner surface of the outer cylinder 2 by vulcanization forming, joins the inner and outer cylinders 1, 2, and serves to dampen vibration, etc. propagated between them. On one end of the rubber elastomer 3, a concave indentation 10 is formed to adjust the spring constant according to the direction of deformation.

Figure 2:
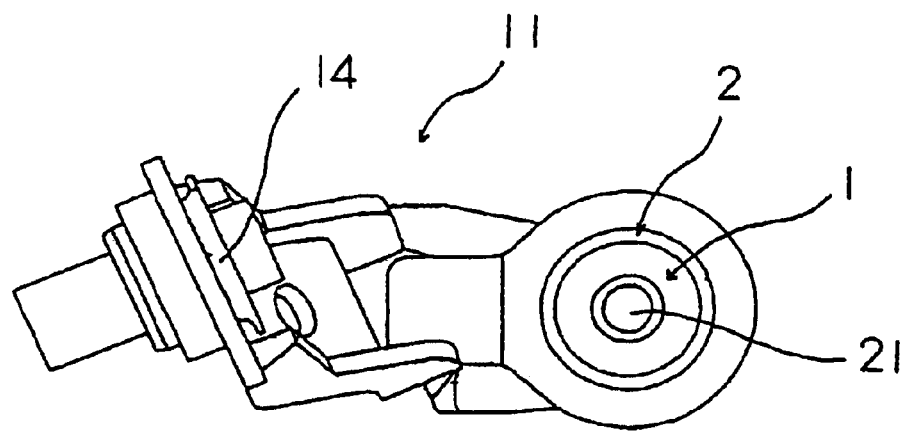
FIG. 2(a) is a plan view of a link support member attached to the wheel side member and FIG. 2(b) is its front view.
Figure 2:
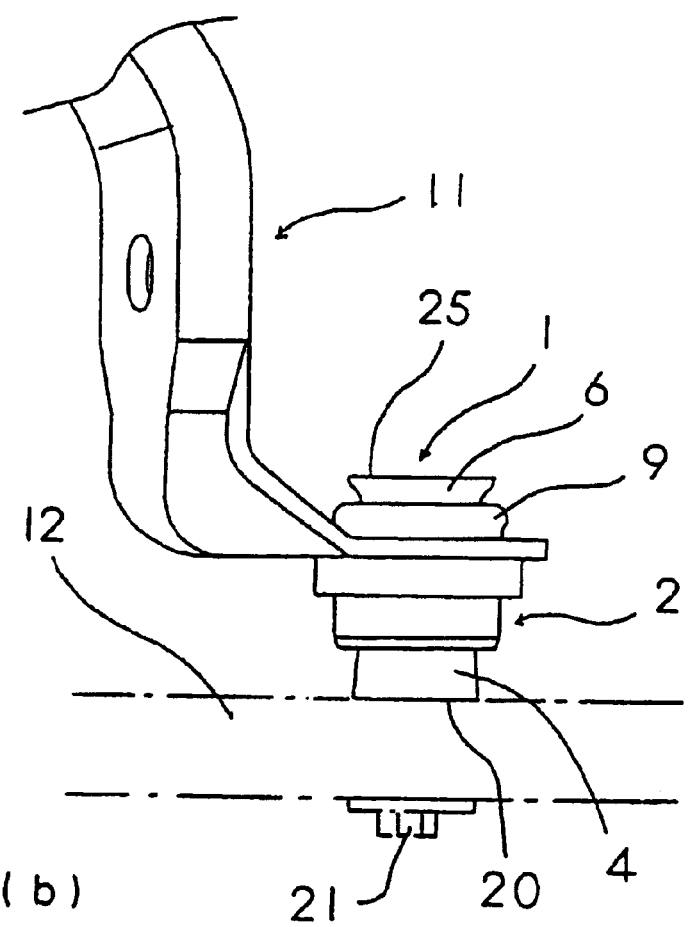

The vibration isolating bushing is, for example, used for attachment of link support member 11 to a member 12 connected to the wheel, as shown in FIG. 2. The link support member 11 supports the one end of the link restraining the fore-and-aft relative movement between the member 12 and the vehicle frame.

The opening 13, in which the outer cylinder 2 of the vibration isolating bushing is press fitted, is provided at the one end side of the link support member 11, and the link support member 11 is attached to the member 12 via the vibration isolating bushing. Further, another vibration isolating bushing 14 is attached to the opening at the other end side of the link support member 11, and the link is supported through the vibration isolating bushing 14.

Figure 3:
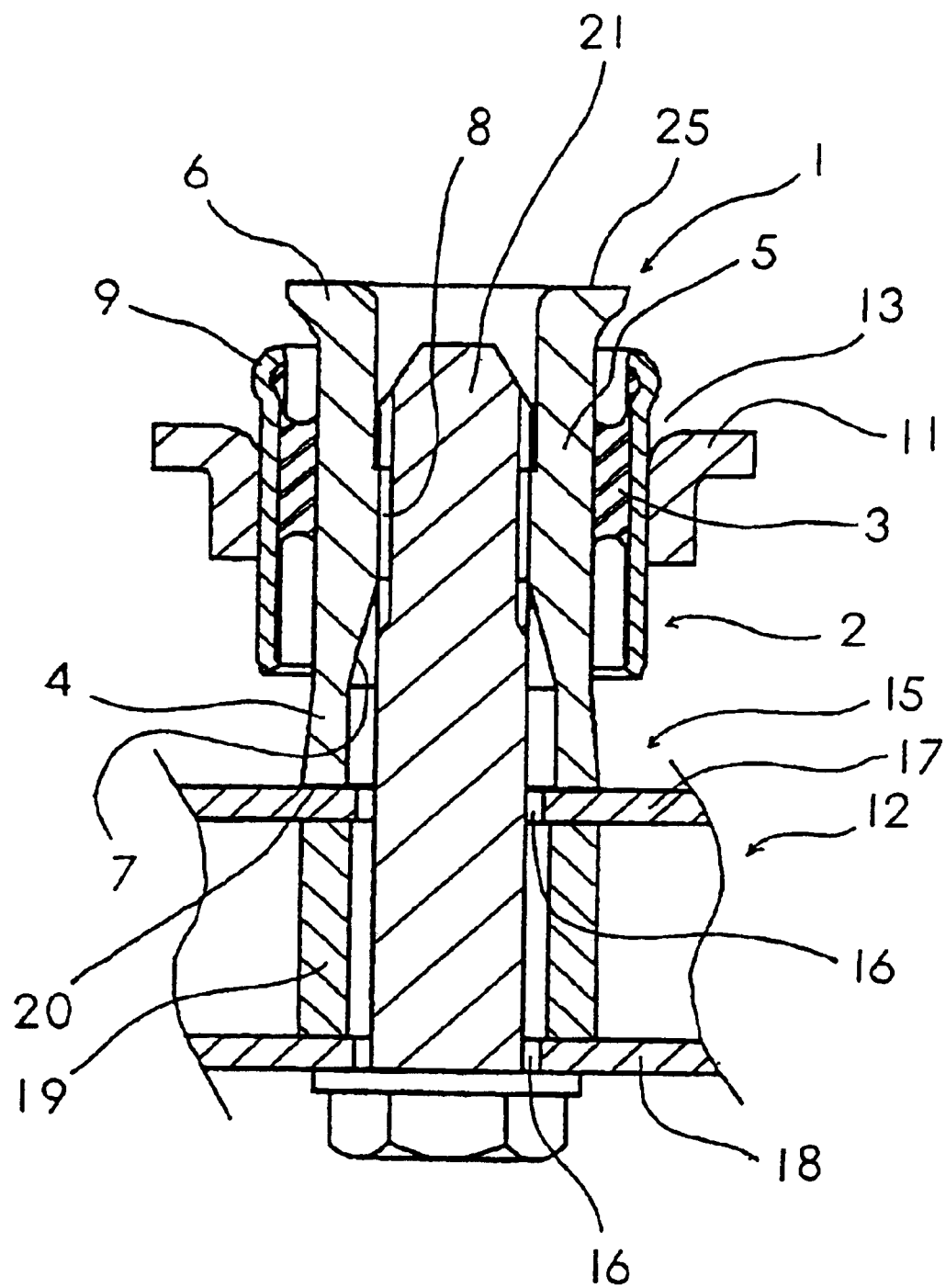
FIG. 3 is an axial sectional view of the vibration isolating bushing attached to the wheel side member.

FIG. 3 shows the vibration isolating bushing inserted into the opening 13 of the link support member 11 and attached to the member 12 connecting to the wheel. A portion 15 of the member 12 attaching to the vibration isolating bushing is made up of upper/lower flanges 17, 18 forming a hole 16 for the bolt, and a reinforcing ring 19 interposed between the upper/lower flanges 17, 18 surrounding the hole 16.

On the top surface of the upper flange 17, one edge surface 20 of the inner cylinder 1 is abutted in alignment with the reinforcing ring 19. A bolt 21 inserted from below the lower flange 18 is screwed into the female threads 8 of the inner cylinder 1 to fasten and secure the inner cylinder 1 to the top surface of the upper flange 17. On the other hand, the outer cylinder 2 is press fitted and secured into the opening 13 of the link support member 11, and the link support member 11 is attached to the top surface of the member 12.

Since the inside diameter (d1) at one edge 4 of the inner cylinder 1 is larger than the inside diameter (d2) of the central portion 5 and of the other edge 6 according to the configuration described above, the bolt 21 is easily inserted into the inner cylinder 1 from below the member 12.

Further, since the outside diameter (D1) of the edge 4 is larger than that (D3) of the central portion 5, the thickness of the edge 4 (D1/2−d1/2) can be made as predetermined even when the inside diameter (d1) of the edge 4 is made larger. Accordingly, since the area of the edge surface 20 can be increased, the surface pressure, when the inner cylinder 1 is fastened to the member 12 by the bolt 21, is made less than the predetermined value to prevent the member 12 from being depressed and the edge 4 from buckling.

Furthermore, since the outside diameter (D2) of the thicker edge 6 of the inner cylinder 1 is larger than the inside diameter (d4) at the edge 9 of the outer cylinder 2 in the same direction, it is possible to prevent the outer cylinder 2 from slipping out of the inner cylinder 1 in this direction when the rubber elastomer 3 is deformed excessively. The member 12 impedes the outer cylinder 2 from slipping out from the other end of the inner cylinder 1.

Figure 4:
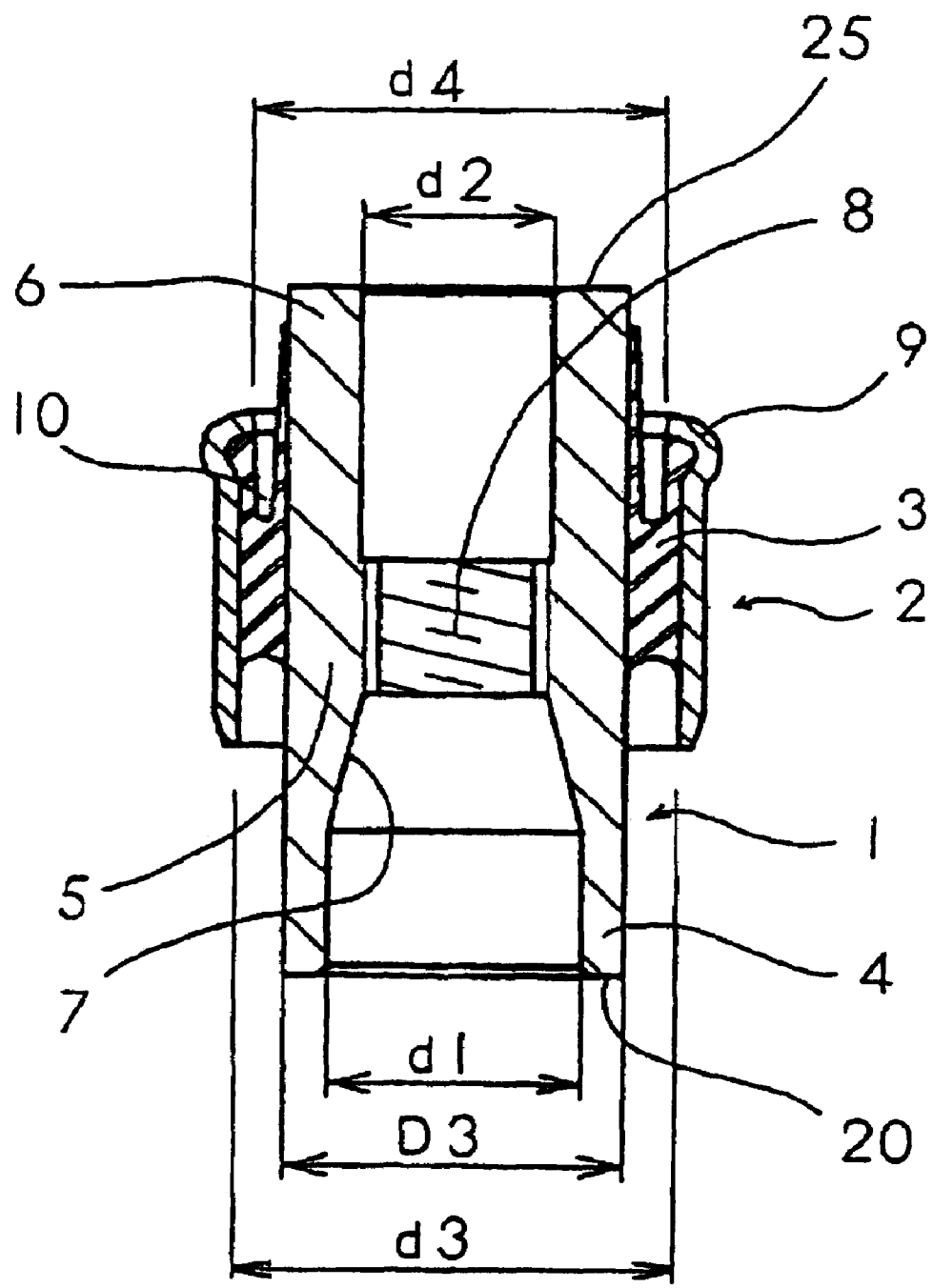
FIG. 4 is an axial sectional view of the vibration isolating bushing before working the inner cylinder.

Next, the manufacturing method of the vibration isolating bushing is described below. As shown in FIG. 4, the inner cylinder 1 is formed, for example, by steel forging. As for the inner cylinder 1, the inside diameter (d1) of the thinner edge 4 is larger than that (d2) of the central portion 5 and of the thicker edge 6, the outside diameter (D3) thereof is made to be constant along the axial direction, and the thickness of the thinner edge 4 (D3/2−d1/2) is thinner than that (D3/2−d2/2) of central portion 5 and the thicker edge 6.

The outer cylinder 2 is disposed around the central portion 5 of the inner cylinder 1, and the rubber elastomer 3 is interposed between the inner and outer cylinders 1, 2 by vulcanization forming. Then, the outside diameter (D3) of both edges 4, 6 of the inner cylinder 1 is enlarged to (D1), (D2), respectively, by the shaping apparatus 22 to form the predetermined shape.

Figure 5:
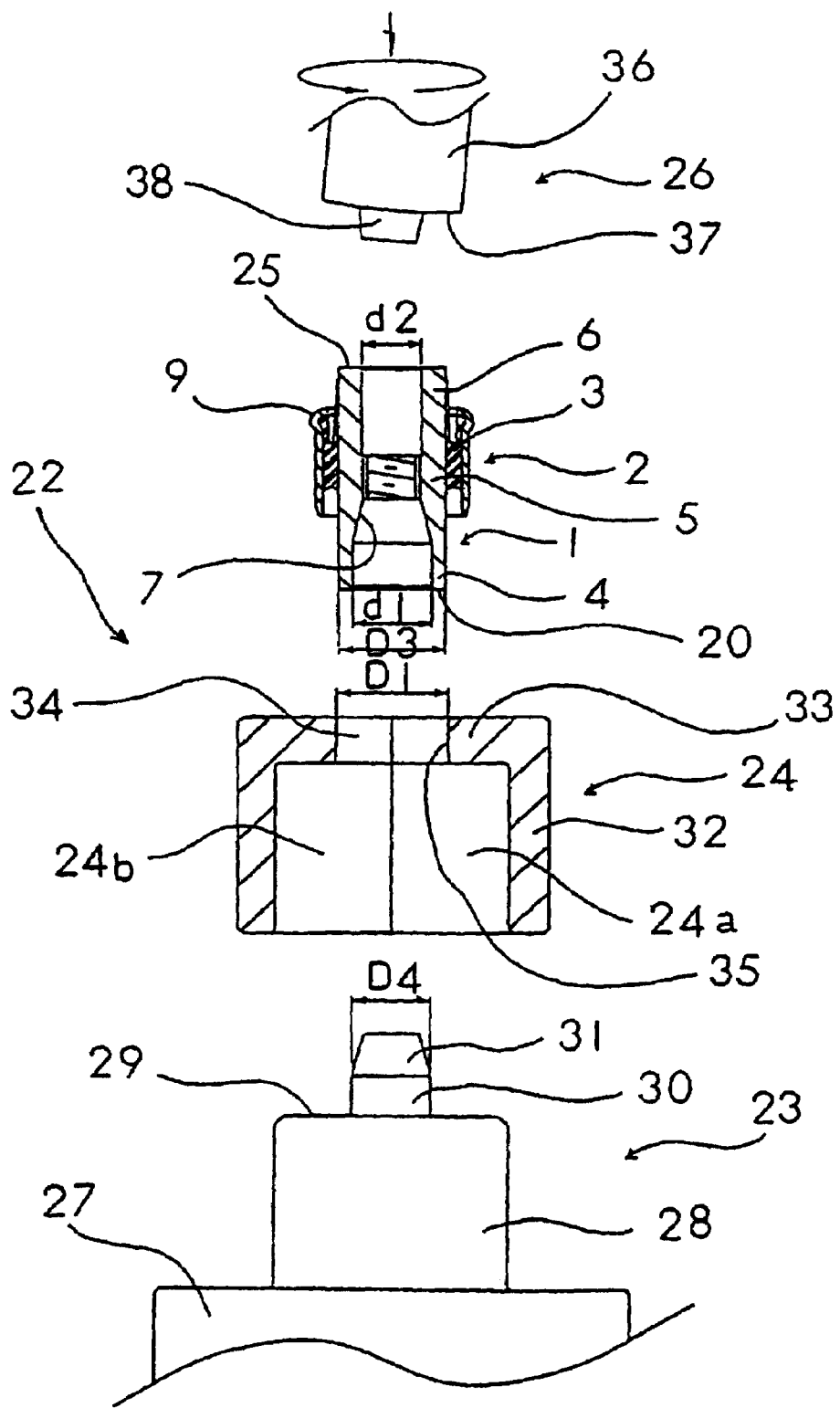
FIG. 5 is an exploded view of a working apparatus of the inner cylinder.

The configuration of the working apparatus 22 is described below. As shown in FIG. 5, the shaping apparatus 22 comprises a base 23 abutting on the thinner edge surface 20 of the inner cylinder 1, an outer die 24 enclosing the thinner edge 4 of the inner cylinder 1, and a pressure forming jig 26 exerting pressure on the thicker edge surface 25 of the inner cylinder 1.

The base 23 is, for example, of higher strength steel than the inner cylinder 1, and an outer die attachment portion 28 of circular cross section is formed at the top surface side of the foundation portion 27. The top surface 29 of the outer die attachment portion 28 is a surface abutting against the thinner edge surface 20 of the inner cylinder 1, and an inner die 30 of circular cross section fitting on the inner circumference of the inner cylinder 1 is provided at the center of the abutting surface 29. The outside diameter (D4) of the inner die 30 is slightly smaller than the inside diameter (d1) of thinner edge 4 of the inner cylinder 1, and its tip portion 31 is continuously tapered to match the taper 7 of the inner cylinder 1.

The outer die 24 is, for example, of higher strength steel than the inner cylinder 1, and freely detachable/attachable to the outer die attachment portion 28 of the base 23. The outer die 24 is made up of a cylindrical portion 32 and a lid portion 33 covering the top of the cylindrical portion 32, and attached to the outer die attachment portion 28 by fitting the cylindrical portion 32 around the outer die attachment portion 28 and abutting the bottom surface of the lid portion 33 against the abutting surface 29. The outer die 24 is divided axially into two, and the halves 24a, 24b are made into one by joining them at a joining area (not shown) when attaching to the outer die attachment portion 28 of the base 23.

Figure 6:
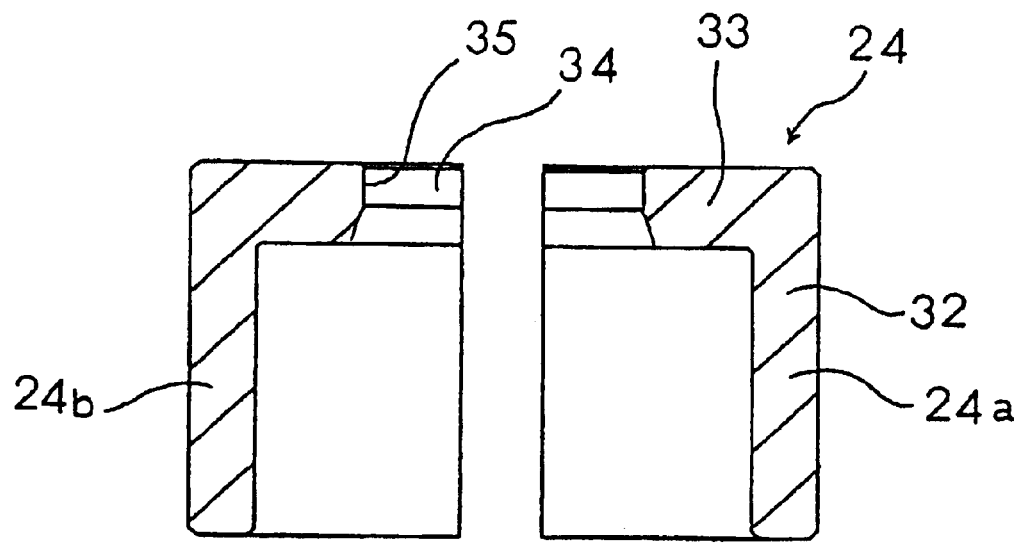
FIG. 6 is an axial sectional view of an outer die.

An opening 34, the diameter (D1) of which is larger than the outside diameter (D3) of the inner cylinder 1 prior to working, is formed at the center of the lid portion 33, and the opening 34 encloses the inner die 30 with the predetermined clearance left when fitting the lid portion 33. As shown in FIG. 6, the diameter of the opening 34 is nearly constant from near the center to the upper surface, and grows larger from near the center to the lower surface. That is, the inner circumference 35 of the opening 34 is formed to accord with the intended outer surface of the inner cylinder 1 near the thinner edge 4 after being worked.

Figure 7:
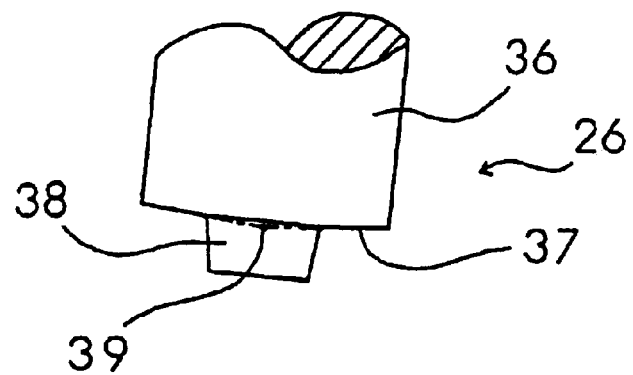
FIG. 7 is a front view of principal parts of pressure forming jig.

As shown in FIG. 7, the pressure forming jig 26 is, for example, of higher strength steel than the inner cylinder 1, and the pressure welding surface 37 in the shape of a section of a circular cone and put in pressure contact with the thicker edge surface 25 of the inner cylinder 1, is circumferentially continuously formed at the bottom end of the pressure forming jig body 36 of circular cross section. A protrusion 38 is formed at the center of the pressure welding surface 37 to insert into the inside of the inner cylinder 1 to keep the pressure forming jig 26 from slipping with respect to the inner cylinder 1 as well as to keep the inside diameter of the thicker edge 6 of the inner cylinder 1 from being diminished in diameter.

Figure 8:
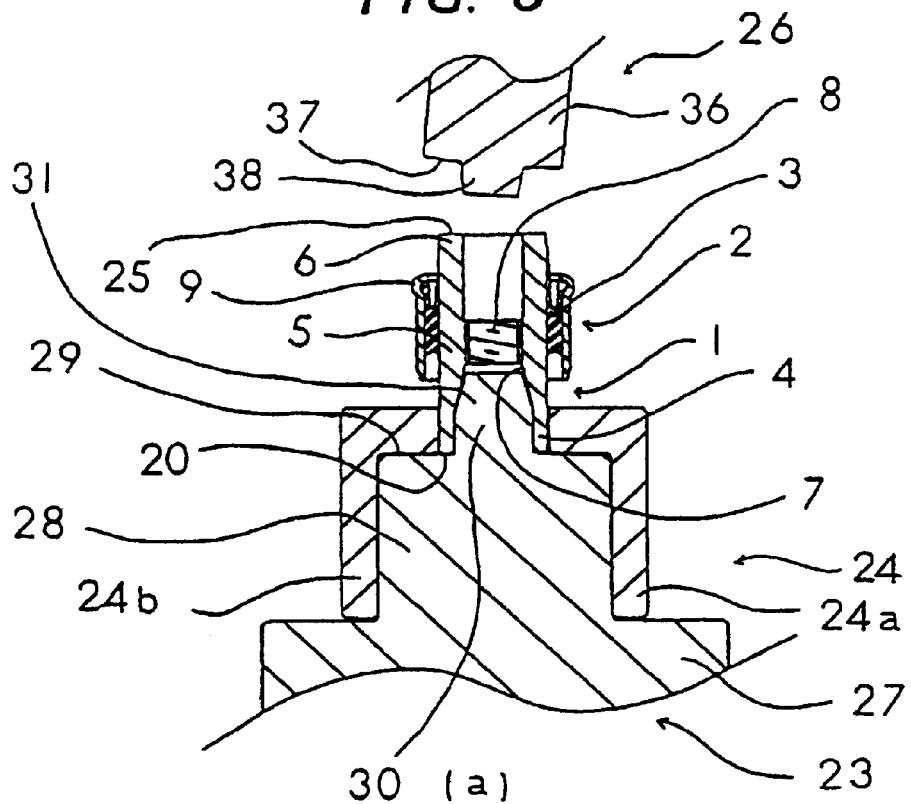
FIG. 8 is an axial sectional view showing the method of working the inner cylinder.
Figure 8:
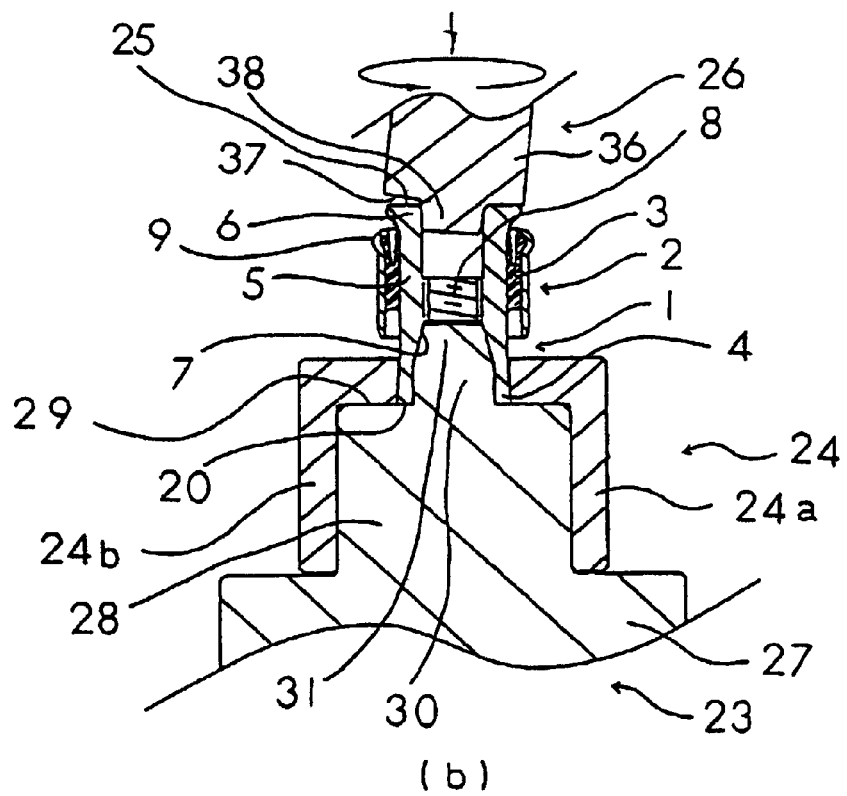
Figure 9:
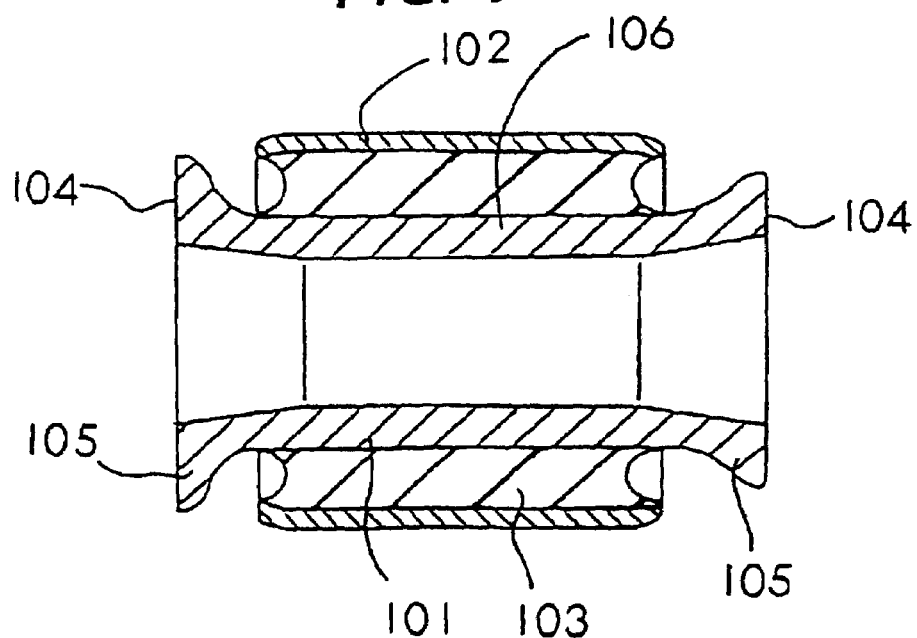
FIG. 9 is an axial sectional view of conventional vibration isolating bushing.
Figure 10:
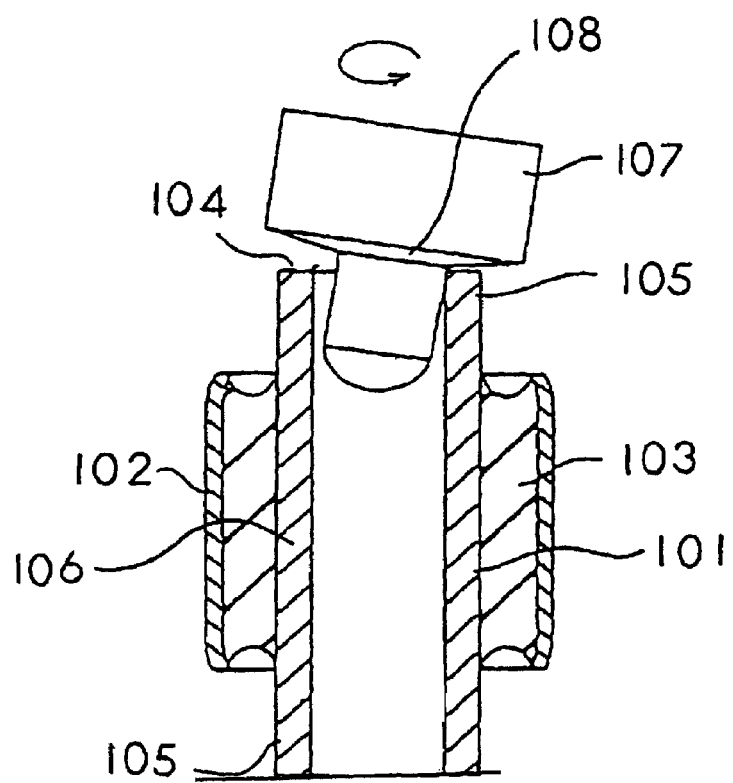
FIG. 10 is an axial sectional view showing conventional method of working the inner cylinder of the vibration isolating bushing.

Next, the procedure of enlarging the outside diameter of both edges 4, 6 of the inner cylinder 1 using the working apparatus 22 is described below. First, as shown in FIG. 8(a), with the inner die 30 fitted to the inner circumferential side of the thinner edge 4 of the inner cylinder 1, the thinner edge surface 20 of the inner cylinder 1 is abutted to the abutting surface 29 of the base 23. With the outer die 24 attached to the outer die attachment portion 28 of the base 23, the outer circumferential side of the thinner edge 4 of the inner cylinder 1 is enclosed by the opening 34 with the predetermined clearance left.

Next, as shown in FIG. 8(b), with the protrusion 38 of the pressure forming jig 26 is inserted into the inside of the thicker edge 6 of the inner cylinder 1, and with an apex 39 of the pressure welding surface 37 located at the center of the thicker edge surface 25 of the inner cylinder 1, the pressure welding surface 37 of the pressure forming jig 26 is abutted to the thicker edge surface 25. The thicker edge surface 25 is entirely pressure formed by making the pressure forming jig 26 be in turning motion centering the apex 39.

As for the inner cylinder 1 before being worked, since the thickness of the thinner edge 4 is thinner than that of the central portion 5 and the thicker edge 6, larger degree of compressive stress is yielded at the thinner edge 4 when the pressure forming jig 26 is put in pressure contact on the thicker edge surface 25 of the inner cylinder 1. Due to plastic deformation caused by the degree of compressive stress, the outside diameter of the thinner edge 4 is enlarged accompanied with contraction in the axial direction.

Enlargement toward the center (diminishment in inside diameter) is impeded by compressive force acting circumferentially. That is, when the thinner edge 4 is compressed in the axial direction, compressive force thereby acts to shorten the circumference. If the thinner edge 4 enlarges inwardly, circumferential length shortens accordingly, and the compressive force acting circumferentially grows larger. This compressive force acts as a radial force pushing out, thereby impeding inward enlargement.

When the inner circumferential surface of the thinner edge 4 abuts on the circumferential surface of the inner die 30 by means of elastic deformation which becomes plastic deformation, inward enlargement is restrained. Consequently, only the outside diameter of the thinner edge 4 is enlarged substantially, and there is no case where the inner die 30 cannot be pulled out after completion of working.

When the outside diameter of the thinner edge 4 is enlarged to "D1" and its outer circumferential surface abuts on the inner circumferential surface 35 of the opening 34 of the outer die 24, further enlargement is restrained, thus completing enlargement of the outside diameter at the thinner edge 4.

After this, the pressure forming jig keeps putting pressure on the thicker edge surface. At this time, since the outside diameter of the thinner edge 4 cannot be enlarged, the outside diameter of the thicker edge 6, on which the pressure forming surface 37 of the pressure forming jig 26 abuts directly, is enlarged, accompanied with contraction in the axial contraction due to plastic deformation. Enlargement of the inner cylinder 1 is completed when the outside diameter of the thicker edge 6 is enlarged to "D2". The outer die 24 is then removed, and production of the vibration isolating bushing is completed. Since the outer die 24 is of two halves, it can be taken out easily from the thinner edge 4 of the inner cylinder 1.

According to the manufacturing method described above, since the outside diameter of the portion of the inner cylinder located within the outer cylinder is nearly constant in the axial direction, and the outside diameter of both edges 4, 6 of the inner cylinder 1 is enlarged after the rubber elastomer 3 between the inner and outer cylinders 1, 2 is vulcanization formed, both edges 4, 6 of the inner cylinder 1 do not get in the way when the dies at the axial extremities required for vulcanization forming of the rubber elastomer 3 are removed.

Besides, since the outside diameter of both edges 4, 5 is enlarged by pressing the pressure forming jig 26 to the thicker edge surface 25 with the thinner edge surface 20 of the inner cylinder 1 abutted against the abutting surface 29 of the base 23, both edges 4, 5 of the inner cylinder 1 can be undergo the pressure formation at one time.

It will be appreciated that the present invention is not limited to the best mode for carrying out the invention described, but variations or modifications may be made appropriately within the scope of this invention. For example, the working method of the inner cylinder can be adopted for any use, not just for the inner cylinder of the vibration isolating bushing, provided that it is a metal cylindrical body the one edge of which is thinner than the sleeve of the central portion and the other side edge.

It also may be that the outside diameter of the thicker edge is enlarged when the circumference of the thinner edge is enlarged without the thinner edge being enclosed by an outer die, when the thickness of the thinner edge comes close to that of the thicker edge. In the case where the thinner edge has enough thickness to prevent buckling, it is not necessary to use the inner die.

INDUSTRIAL APPLICABILITY

It will be obvious from the description above that, according to the vibration isolating bushing of the present invention, the inside diameter of the thinner edge can be enlarged by enlarging the outside diameter of both edges of the inner cylinder after vulcanization forming of the rubber elastomer without making the area of the thinner edge surface of the inner cylinder smaller. Accordingly, for example, when the vibration isolating bushing is used for attachment to a member of the link support connected to the wheel, the tightening bolt can easily be inserted, without causing depression of the member on which the thinner edge surface of the inner cylinder abuts, and without buckling of the thinner edge, thus contributing to shortening of manufacturing time and cost reduction.

Furthermore, since this is an efficient method capable of enlarging the outside diameter of both edges by the pressure forming operation at one time through pressing the pressure forming jig on the thicker edge, it will contribute to working time shortening and cost reduction.

What is claimed is:

1. A working apparatus used for the working of a metal cylindrical body having a thickness which is thinner at one edge than at the other edge comprising:

a base for abutting on the thinner edge surface of the cylindrical body, an outer die for enclosing the thinner edge of the cylindrical body, a pressure forming jig for pressing on the other edge of the cylindrical body, and, an inner die to be fitted to an inner circumference of the thinner edge of the cylindrical body, said inner die being provided on the abutting surface of the base, against which the thinner edge surface of the cylindrical body is abutted, wherein the outer die is of two halves and freely detachable/attachable to the base to form an opening enclosing the thinner edge of the cylindrical body at a constant interval when the outer die is attached to the base, so that the thinner edge of the cylindrical body can be shaped into the opening to have an increased thickness and an enlarged outer diameter when the pressure forming jig presses on the other edge of the cylindrical body and on the base, and the pressure forming jig is made up of a section of a circular cone, formed to have a pressure contact surface that applies pressure to the other edge surface of the cylindrical body, said circular cone having an axis passing through an apex, said axis being slanted with respect to an axis of the outer die, the inner die, and the base, wherein the pressure forming jig can turn on the apex so that the other edge of the cylindrical body can have an enlarged outer diameter by the turning motion of the pressure forming jig.

* * * * *